US008060911B2

(12) United States Patent
Hahm

(10) Patent No.: US 8,060,911 B2
(45) Date of Patent: Nov. 15, 2011

(54) APPARATUS, MEDIUM, AND METHOD FOR DISPLAYING DOWNLOAD STATUS OF DATA

(75) Inventor: Tae-jong Hahm, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1013 days.

(21) Appl. No.: 11/152,151

(22) Filed: Jun. 15, 2005

(65) Prior Publication Data

US 2005/0278770 A1 Dec. 15, 2005

(30) Foreign Application Priority Data

Jun. 15, 2004 (KR) ........................ 10-2004-0044170

(51) Int. Cl.
*H04N 7/173* (2011.01)
*H04N 7/16* (2006.01)
*G06F 3/00* (2011.01)

(52) U.S. Cl. .......... 725/132; 725/37; 725/131; 725/139; 725/140

(58) Field of Classification Search .................. 725/131, 725/132, 134, 139, 140, 142, 151, 152, 37, 725/100, 133, 141, 153; 717/168, 173
See application file for complete search history.

(56) References Cited

U.S. PATENT DOCUMENTS

| | | | |
|---|---|---|---|
| 6,545,587 B1 * | 4/2003 | Hatakeyama et al. | 340/3.31 |
| 6,946,988 B2 * | 9/2005 | Edwards et al. | 341/176 |
| 6,985,069 B2 * | 1/2006 | Marmaropoulos | 340/3.9 |
| 7,051,325 B2 * | 5/2006 | Choi et al. | 717/168 |
| 2002/0018050 A1 * | 2/2002 | Turner | 345/169 |
| 2002/0056090 A1 | 5/2002 | Wagner et al. | |
| 2002/0067283 A1 | 6/2002 | Marmaropoulos | |
| 2002/0152467 A1 * | 10/2002 | Fiallos | 725/50 |
| 2004/0140974 A1 * | 7/2004 | Hong et al. | 345/214 |

FOREIGN PATENT DOCUMENTS

KR 2003-63694 7/2003

* cited by examiner

*Primary Examiner* — Kristine Kincaid
*Assistant Examiner* — John Schnurr
(74) *Attorney, Agent, or Firm* — Staas & Halsey LLP

(57) ABSTRACT

An apparatus, medium, and method for displaying the downloading progress of data on an auxiliary display window when software is downloaded into a digital broadcast receiver (e.g., a set-top box). The apparatus for displaying the downloading progress of data includes a reconstruction unit, which receives broadcast signals from a broadcasting station and reconstructs data from the received broadcast signals, a processing unit, which calculates the downloading progress of the reconstructed data, an auxiliary display unit, which displays the calculation result obtained by the processing unit, and a control unit, which determines whether software to-be-downloaded is included in the reconstructed data, switches a current screen mode of the auxiliary display unit to a download mode if the software is included in the reconstructed data, and controls the auxiliary display unit to display the calculation result obtained by the processing unit.

11 Claims, 4 Drawing Sheets

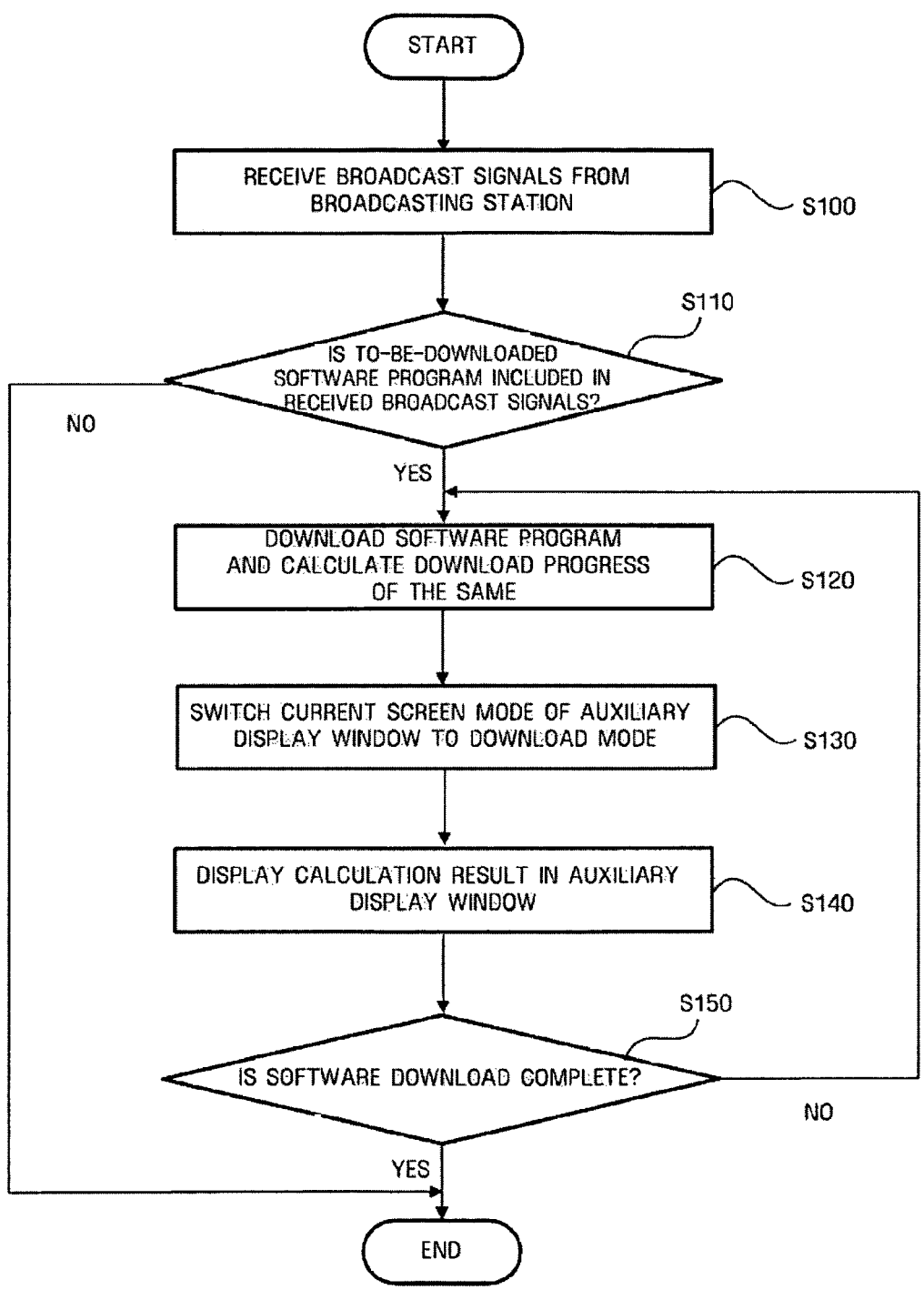

APPARATUS, MEDIUM, AND METHOD FOR DISPLAYING DOWNLOAD STATUS OF DATA

CROSS-REFERENCE TO RELATED APPLICATIONS

This application claims priority benefit of Korean Patent Application No. 10-2004-0044170 filed on Jun. 15, 2004 in the Korean Intellectual Property Office, the disclosure of which is incorporated herein by reference in its entirety.

BACKGROUND OF THE INVENTION

1. Field of the Invention

Embodiments of the present invention relate to an apparatus, medium, and method for displaying the downloading progress of data, and more particularly, to an apparatus, medium, and method for displaying the downloading progress of software in an auxiliary display window when downloading software to a digital broadcast receiver (e.g., a set-top box).

2. Description of the Related Art

In general, there are two downloading techniques, i.e., a foreground downloading technique and a background downloading technique.

In the foreground downloading technique, a TV receiver is used during downloading, while a user is watching TV. Thus, the user is interrupted while watching TV as the download progresses.

In addition, the foreground downloading technique is implemented in two ways: the downloading status can be displayed on the TV screen when a digital broadcast receiver is in an operating mode; and the downloading status isn't displayed on the TV screen when the digital broadcast receiver is in a standby mode.

In the background downloading technique, even while a user is watching TV, a downloading task is performed without interfering with the user's viewing, and the user doesn't notice that downloading is under way.

FIG. 1 is a diagram illustrating a conventional TV screen on which a download progress is displayed. Referring to FIG. 1, when the downloading begins, a message indicating that data is currently being downloaded and a progress bar indicating the download progress are displayed on the TV screen.

However, if the downloading is initiated while a user is not watching TV, the user will not know about the downloading until he or she views the download display window on the TV screen, after turning on the TV.

Accordingly, the user has no option but to watch the download display window until the data download is complete or to check whether the downloading is completed by switching channels while watching a broadcast program of another channel.

Therefore, typically, the user must turn on the TV (or a device connected to a video output port) in order to check whether the data download is complete. When the user watches a broadcast program of a channel other than the channel where the data is being downloaded, he or she must switch channels to see if the data download is complete, which is burdensome.

U.S. Patent Application Publication No. 2002-067283 discloses a remote controller having a state indicator which displays the data download progress by way of a vertical bar or a percent indicator. However, the disclosed technique requires that the remote controller be located close to the user, for the user to identify whether the data download is complete. In addition, the disclosed technique also requires that the remote controller include a display device exclusively used for displaying the progress of the data download, and thus, the manufacturing costs of the remote controller may undesirably increase.

SUMMARY OF THE INVENTION

Embodiments of the present invention set forth an apparatus, medium, and method for displaying the downloading progress of data on an auxiliary display window, installed on a digital broadcast receiver (e.g., a set-top box), when downloading software to the digital broadcast receiver, enabling a user to conveniently identify whether the downloading of the new software has completed. The software may be a program, and further, may be a new software program, for example.

To achieve the above and/or other aspects and advantages, embodiments of the present invention include an apparatus for displaying a data downloading progress, including a reconstruction unit to receive broadcast signals and reconstruct data in the received broadcast signals, a processing unit to calculate a progress of a downloading of the reconstructed data, an auxiliary display unit to display the progress of the downloading, and a control unit to determine whether to-be-downloaded software is included in the reconstructed data and to switch a current screen mode of the auxiliary display unit to a download mode if the software is included in the reconstructed data, and to control the auxiliary display unit to display the progress of the downloading.

The reconstruction unit may include a tuner to tune to a predetermined frequency band to receive signals from a broadcasting station, a demultiplexer to extract data from the received signals by demultiplexing the received signals, and a decoder to decode the extracted data.

The apparatus may further include a storage unit to store the reconstructed data.

To achieve the above and/or other aspects and advantages, embodiments of the present invention include a method of displaying a progress of downloading data, including receiving broadcast signals, determining whether to-be-downloaded software is included in the received broadcast signals, downloading the to-be-downloaded software if the software is included in the received broadcast signals, calculating a progress of the downloading of the software, and displaying the progress on an auxiliary display window.

The receiving of the broadcast signals may include tuning a predetermined frequency band to receive signals from a broadcasting station, extracting data from the received signals by demultiplexing the received signals, and decoding the extracted data.

The method may include switching a current screen mode of the auxiliary display window to a download mode if the software is included in the received signals.

In addition, the auxiliary display window may be installed on a front surface of a digital broadcast receiver and displays the progress.

To achieve the above and/or other aspects and advantages, embodiments of the present invention include a receiver, including a reconstruction unit to receive signals and reconstruct data in the received signals, a control unit to output reconstructed video and audio data from the received signals for display by a main display unit, separate from the receiver, and to output auxiliary data including information of at least a progress of a download of software included in the received signals, and an auxiliary display unit receiving the auxiliary data and displaying at least the progress of the downloading.

The control unit may further determine whether the software is included in the reconstructed data and switch a current screen mode of the auxiliary display unit to a download mode if the software is included in the reconstructed data, and to control the auxiliary display unit to display the progress of the downloading.

In addition, the reconstruction unit may include a tuner to tune to a predetermined frequency band to receive signals from a broadcasting station, a demultiplexer to extract data from the received signals by demultiplexing the received signals, and a decoder to decode the extracted data.

The auxiliary display may be installed on a front surface of the receiver.

To achieve the above and/or other aspects and advantages, embodiments of the present invention include an auxiliary display unit receiving auxiliary data for displaying at least a progress of a downloading by a receiver according to embodiments of the present invention.

To achieve the above and/or other aspects and advantages, embodiments of the present invention include a medium including computer readable code implementing embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a flowchart of a method for displaying the progress of a data download, according to an exemplary embodiment of the present invention.

DETAILED DESCRIPTION OF THE PREFERRED EMBODIMENTS

Figure 1:
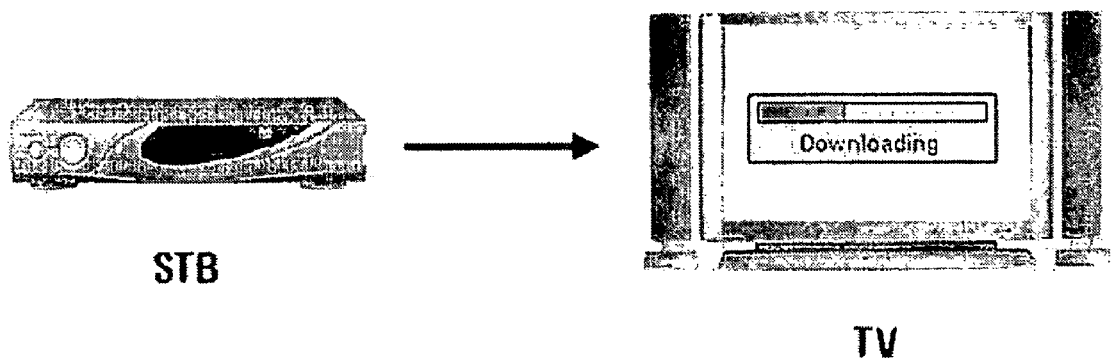
FIG. 1 is a diagram illustrating a TV screen displaying a data download progress indicator.

Advantages and aspects of the present invention and methods of accomplishing the same may be understood more readily by reference to the following detailed description of embodiments and the accompanying drawings. The present invention may, however, be embodied in many different forms and should not be construed as being limited to the embodiments set forth herein. Rather, these embodiments are provided only so that this disclosure will be thorough and complete and will fully convey the concept of the invention to those skilled in the art. Like reference numerals refer to like elements throughout the specification.

Figure 2:
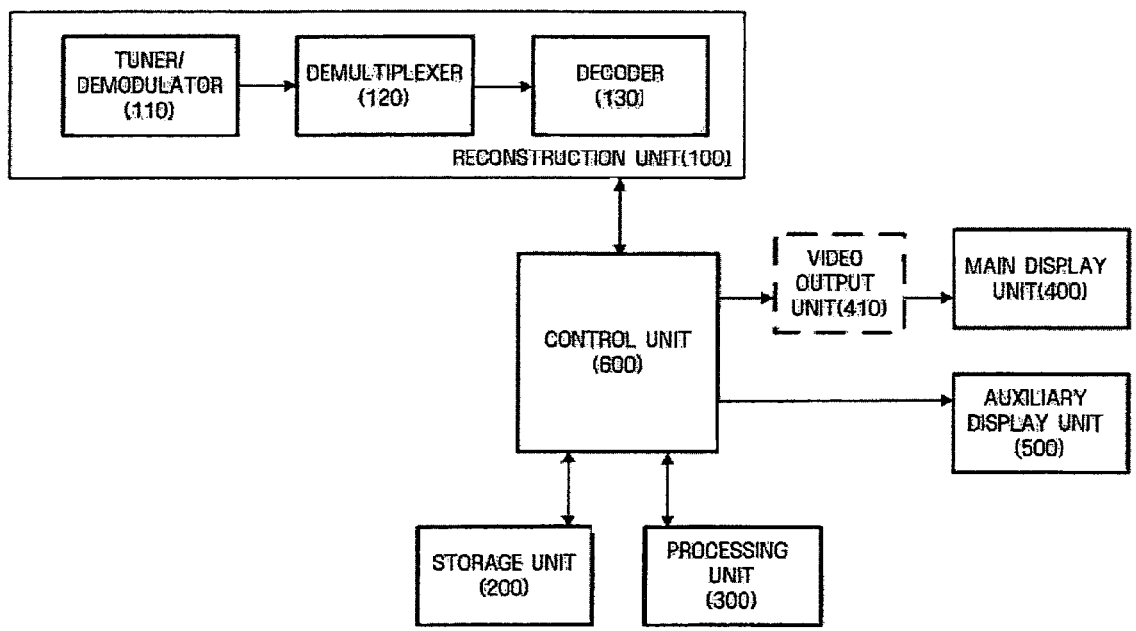
FIG. 2 is a block diagram of an apparatus for displaying the progress of a data download, according to an exemplary embodiment of the present invention.

FIG. 2 is a block diagram of an apparatus for displaying the progress of a data download, according to an exemplary embodiment of the present invention. Referring to FIG. 2, the apparatus includes a reconstruction unit 100, a storage unit 200, a processing unit 300, a main display unit 400, an auxiliary display unit 500, and a control unit 600.

The reconstruction unit 100 receives broadcast signals from a broadcasting station and reconstructs data from the received broadcast signals, for example. The reconstruction unit 100 may include a tuner/demodulator 110, a demultiplexer 120, and a decoder 130, also for example.

As an example, the tuner/demodulator 110 may tune to a predetermined frequency band to receive signals from a broadcasting station, and then output a bitstream.

The demultiplexer 120 may demultiplex the bitstream received from the tuner/demodulator 110 to extract audio signals, video signals, and data. Here, the data may be software used for driving a digital broadcast receiver (e.g., a set-top box). Specifically, the data may be software used for updating information stored in the digital broadcast receiver when satellite, cable, or terrestrial wave information changes due to broadcasting station changes, or it may be a software used for adding new software functions to the digital broadcast receiver or correcting errors in the digital broadcast receiver, noting that many additional types of data may be downloaded for differing reasons.

Here, the decoder 130 can then decode the audio signals, the video signals, and the data, which have been demultiplexed by the demultiplexer 120.

The storage unit 200 may then store the decoded audio signals, the decoded video signals, and the decoded data.

The processing unit 300 can calculate the downloading progress of data (e.g., software) decoded by the decoder 130. Here, the downloading progress can be obtained by calculating the percentage of the software downloaded relative to the overall volume of the software.

The auxiliary display unit 500 displays the calculation result obtained by the processing unit 300, e.g., as numbers, letters, symbols, or any combination thereof. The main display unit 400 can be a device (e.g., a TV) which displays video signals received via the digital broadcast receiver.

In an embodiment, the main display unit 400 and the auxiliary display unit 500 are separate from each other and operate independently of each other. Further, the auxiliary display unit 500 may not provide video and audio data capable of being provided by the main display unit 400, i.e., auxiliary display unit 500 would not provide similar video data as provided by main display unit 400.

The main display unit 400 may also be separate from the apparatus of FIG. 2, in which case, the main display unit 400 may be connected to the apparatus of FIG. 2 via the control unit 600 and a video output unit 410, for example.

The control unit 600 may determine whether to-be-downloaded software is included in received broadcast signals of the reconstruction unit 100 and may switch a current screen mode of an auxiliary display window to a download mode if the software is included in these signals.

The control unit 600 controls the auxiliary display unit 500 to display the calculation result obtained by the processing unit 300.

Here, the auxiliary display window may be installed on a front surface of the main body of the digital broadcast receiver, for example. As noted above, the auxiliary display window, unlike the main display unit 400 that outputs video signals input thereto, provides the user with auxiliary information, regardless of whether the user watches TV.

The auxiliary display window may be designed to have two screen modes, i.e., a regular mode and a download mode. In the regular mode, information about the digital broadcast receiver, such as a channel number that the user is currently watching, and a current screen state, can be displayed on the auxiliary display window. In the download mode, the data download progress can displayed on the auxiliary display window as numbers, letters, symbols, or any combination thereof, for example.

FIG. 3 is a flowchart of a method for displaying the data downloading progress data, according to an exemplary embodiment of the present invention.

In operation S100, the reconstruction unit 100 of a digital broadcast receiver (e.g., a set-top box) receives broadcast signals from a broadcasting station and reconstructs data from the received broadcast signals. Specifically, the tuner/demodulator 110 tunes to a predetermined frequency band, receives signals from a broadcasting station, and outputs a bitstream of the received signal. The demultiplexer 120 demultiplexes this bitstream to extract audio signals, video signals, and data. The decoder 130 decodes the audio signals, the video signals, and the data, which have been demultiplexed by the demultiplexer 120.

In operation S110, the control unit 600 determines whether to-be-downloaded software is included in the reconstruction unit 100. This determination may be done through extensions of data reconstructed by the reconstruction unit 100.

If software is included in received broadcast signals of the reconstruction unit 100, the control unit 600 may request the processing unit 300 to calculate the downloading progress of the software.

In operation S120, the processing unit 300 calculates the download progress of the software, by a percent of the software, for example.

In operation S130, the control unit 600 can switch a current screen mode of an auxiliary display window to a download mode. Here, the auxiliary display window can be installed on a front surface of the main body of the digital broadcast receiver, and information displayed on the auxiliary display window varies depending on whether the current screen mode of the auxiliary display window is a regular mode or the download mode, for example, noting that additional embodiments are also available.

In the regular mode, information such as the time a channel number that the user is currently watching, and a current screen state, can be displayed on the auxiliary display window, and in the download mode, the data download progress can be displayed on the auxiliary display window, e.g., as numbers, letters, symbols, or any combination thereof, to indicate the download progress of the software.

In operation S140, the control unit 600 may send the calculation result obtained by the processing unit 300 to the auxiliary display unit 500 so that the software download progress can be displayed on the auxiliary display window.

In operation S150, the control unit 600 may determine whether the software download is complete. If the software download is not complete, operations S120 through S140 can be repeated until the download is complete.

Figure 4A:
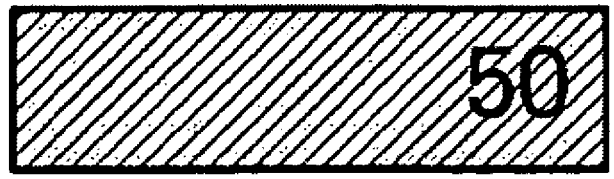
FIGS. 4A-4C illustrate examples of download progresses that are displayed on an auxiliary display window, according to an exemplary embodiment of the present invention.
Figure 4B:
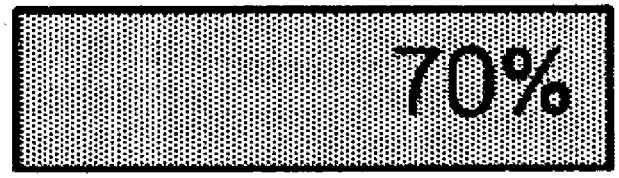
Figure 4C:
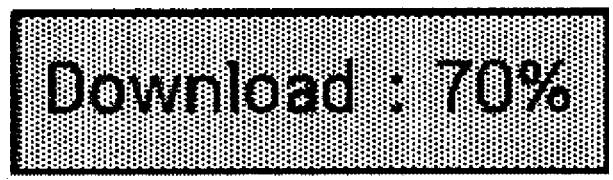

FIGS. 4A-4C illustrate examples of download progresses that are displayed on the auxiliary display window, according to an exemplary embodiment of the present invention.

Referring to FIGS. 4A through 4C, if broadcast signals sent from a broadcasting station contain the to-be-downloaded software, software download can be initiated and the download progress can be displayed on an auxiliary display.

For example, the downloading progress of the software may be displayed on the auxiliary display window as numbers, as shown in FIG. 4A, as a combination of a combination of numbers and a symbol, as shown in FIG. 4B, or as a combination of letters, numbers, and a symbol, as shown in FIG. 4B, for example.

In short, in embodiments of the present invention, when broadcast signals sent from a broadcasting station are received, a digital broadcast receiver can determine whether to-be-downloaded software is included in the broadcast signals. If the software is included in the broadcast signals, the digital broadcast receiver can download the software and can calculate the download progress, e.g., by percent of download, and display the calculation result as numbers, letters, symbols, or any combination thereof on an auxiliary display window. Accordingly, a user can recognize that the software is downloading with reference to the auxiliary display window, even when not watching TV.

Exemplary embodiments may be implemented through general-purpose computing devices by running computer readable code/instructions from a medium, e.g. computer-readable medium, including but not limited to storage/transmission media such as magnetic storage media (ROMs, RAMs, hard disk drives, floppy disks, magnetic tapes, etc.) and optically readable media (CD-ROMs, DVDs, etc. The functional programs, instructions, codes and code segments for implementing embodiments of the present invention may be easily deducted by programmers in the art which the present invention belongs to.

In conclusion, those skilled in the art will appreciate that many variations and modifications can be made to the embodiments without substantially departing from the principles of the present invention. Therefore, the disclosed embodiments of the invention should be used in a generic and descriptive sense only and not for purposes of limitation.

The apparatus, medium, and method for displaying the data download progress according to the present invention have at least the following advantages.

Firstly, the software downloading progress can be displayed in an auxiliary display window installed on a digital broadcast receiver (e.g., a set-top box) when downloading the software. Thus, it is possible to maximize a user's convenience by allowing the user to identify both whether software is downloading and the progress of the download with reference to an auxiliary display window and without the need to turn on a TV or to switch channels.

Secondly, since the auxiliary display window may be installed on a front surface of the digital broadcast receiver, an additional display device is unnecessary.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A receiver for displaying a data downloading progress, comprising:
   a reconstruction unit to receive broadcast signals and to reconstruct data in the received broadcast signals;
   a processing unit to calculate a progress of a downloading of software in the received broadcast signals, which is reconstructed by the reconstruction unit;
   an auxiliary display window to display the progress of the downloading; and
   a control unit to determine whether to-be-downloaded software is included in the reconstructed data and to automatically switch a current screen mode of the auxiliary display window to a download mode if the software is included in the reconstructed data, and to control the auxiliary display window to display the progress of the downloading,
   wherein the control unit is coupled to the auxiliary display window and a main display unit,
   wherein the main display unit operates independently of the auxiliary display unit, and the auxiliary display window operates independently of the main display unit, wherein the screen mode of the auxiliary display window comprises a regular mode and a download mode, and in the case of the regular mode, a state of the receiver and the main display unit are provided and in the case of the download mode, the download progress state is provided, and wherein the auxiliary display window is part of a front surface of the receiver.

2. The receiver of claim 1, wherein the reconstruction unit comprises:

a tuner to tune to a predetermined frequency band to receive signals from a broadcasting station;

a demultiplexer to extract data from the received signals by demultiplexing the received signals; and a decoder to decode the extracted data.

3. The receiver of claim 1, further comprising a storage unit to store the reconstructed data.

4. A method of displaying a progress of downloading data on an auxiliary display window of a receiver independent of displaying video signals on a main display unit, comprising:

receiving broadcast signals including video signals using the receiver;

determining whether to-be-downloaded software is included in the received broadcast signals;

downloading the to-be-downloaded software to the receiver if the software is included in the received broadcast signals;

calculating a progress of the downloading of the software; and displaying the progress on the auxiliary display window of the receiver independent from displaying of video signals on the main display unit, wherein the main display unit operates independently from the auxiliary display window, and the auxiliary display window operates independently of the main display unit, wherein a screen mode of the auxiliary display window comprises a regular mode and a download mode, and in the case of the regular mode, the state of a digital broadcasting receiver and additional information are provided and in the case of the download mode, the download progress state is provided, wherein the auxiliary display window is part of a front surface of the receiver, and wherein if the software is included in the received broadcast signals, a current screen mode of the auxiliary display window is automatically switched to a download mode.

5. The method of claim 4, wherein the receiving of the broadcast signals comprises:

tuning a predetermined frequency band to receive signals from a broadcasting station;

extracting data from the received signals by demultiplexing the received signals; and decoding the extracted data.

6. The method of claim 4, further comprising switching a regular screen mode of the auxiliary display window to a download mode if the software is included in the received signals.

7. A non-transitory computer-readable storage medium storing computer-readable code that controls a control unit to implement the method of claim 4.

8. A receiver, comprising:

a reconstruction unit to receive signals and to reconstruct data in the received signals;

a control unit to output reconstructed video and audio data from the received signals for display by a main display unit, separate from the receiver, and to output auxiliary data including information of at least a progress of a download of software included in the received signals; and an auxiliary display unit to receive the auxiliary data and to display at least the progress of the downloading, wherein the control unit is coupled to the auxiliary display unit and a main display unit, wherein the main display unit operates independently of the auxiliary display unit, and the auxiliary display unit operates independently of the main display unit, wherein a screen mode of the auxiliary display unit comprises a common mode and a download mode, and in the case of the common mode, the state of a digital broadcasting receiver and additional information are provided and in the case of the download mode, the download progress state is provided, wherein the auxiliary display window is part of a front surface of the receiver, and wherein if the software is included in the reconstructed data, a current screen mode of the auxiliary display window is automatically switched to a download mode.

9. The receiver of claim 8, wherein the control unit further determines whether the software is included in the reconstructed data and switches a current screen mode of the auxiliary display unit to a download mode if the software is included in the reconstructed data, and to control the auxiliary display unit to display the progress of the downloading.

10. The receiver of claim 8, wherein the reconstruction unit comprises:

a tuner to tune to a predetermined frequency band to receive signals from a broadcasting station;

a demultiplexer to extract data from the received signals by demultiplexing the received signals; and a decoder to decode the extracted data.

11. An auxiliary display window displaying at least a progress of a downloading by the receiver of claim 8.

* * * * *